United States Patent [19]
Chamberlain, III

[11] 3,954,540
[45] May 4, 1976

[54] METHOD OF MAKING PERFORATED VINYL FILM CEILING BOARD

[75] Inventor: Walter W. Chamberlain, III, Lancaster, Pa.

[73] Assignee: Armstrong Cork Company, Lancaster, Pa.

[22] Filed: Feb. 25, 1974

[21] Appl. No.: 445,610

Related U.S. Application Data

[62] Division of Ser. No. 272,859, July 18, 1972, Pat. No. 3,844,875.

[52] U.S. Cl............................ 156/253; 181/33 GA; 428/137
[51] Int. Cl.²...................... B32B 3/10; E04B 1/86
[58] Field of Search...................... 156/253, 85, 46; 181/33 G, 33 GA; 161/112, 160, 109; 52/145, 144; 428/131, 137, 138

[56] References Cited
UNITED STATES PATENTS

| | | |
|---|---|---|
| 1,959,057 | 5/1934 | Kliefoth.............................. 52/144 |
| 3,137,364 | 6/1964 | Akerson............................ 181/33 G |
| 3,422,920 | 1/1969 | Greason et al..................... 181/33 G |

OTHER PUBLICATIONS

Wilde, G., et al., *Plasticizers*, In *Modern Plastics Encyclopedia*, Vol. 46, No. 10A, Oct. 1969, pp. 286, 288, 290.

*Primary Examiner*—William A. Powell
*Assistant Examiner*—M. G. Wityshyn

[57] ABSTRACT

A standard fiber composition ceiling board is provided with an outer laminate of plasticized vinyl film. The holes in the film are smaller than the holes in the fiber composition ceiling board. The product is made by laminating the vinyl film to the ceiling board, then perforating the film and the ceiling board with pin punches. The perforations in the board stay at the size at which they are formed, while the holes in the film shrink in size.

1 Claim, 2 Drawing Figures

U.S. Patent May 4, 1976 3,954,540
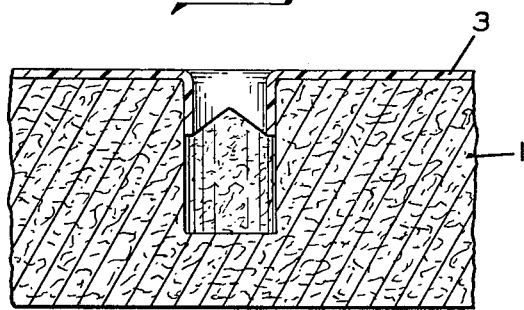
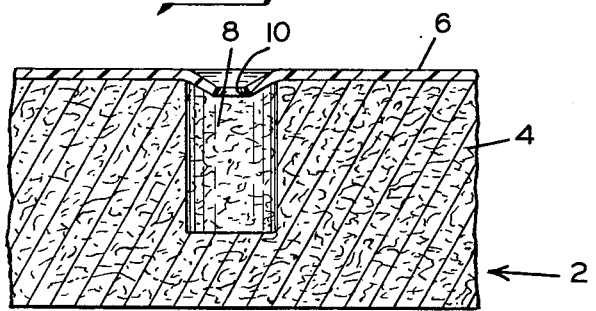

METHOD OF MAKING PERFORATED VINYL FILM CEILING BOARD

This is a division, of application Ser. No. 272,859, filed July 18, 1972, now U.S. Pat. No. 3,844,875, issued Oct. 29, 1974.

BACKGROUND OF THE INVENTION

1. Field of the Invention

The invention is directed to a ceiling board and, more particularly, to a perforated ceiling board with a vinyl facing.

2. Description of the Prior Art

Typical of the standard fiber composition ceiling boards is that shown in U.S. Pat. No. 2,791,289, which issued to D. A. Proudfoot et al. This patent shows a fiberboard ceiling product which has been provided with perforations 11 due to the use of pin punches 12. These ceiling boards are made from either vegetable fiber or mineral wool fiber, and are laid up in mat form by several different techniques.

U.S. Pat. No. 3,437,551 discloses a polyurethane panel which has a thermoplastic film adhered thereto. This patent teaches that a plug of material must be removed from a laminate structure of vinyl and foam or else the foam would close up any perforation which is made by a punch which merely pierced the foam. With vegetable fiber and mineral wool fiberboards, there is usually no condition involving the closing up of a perforation made by a punch such as you would encounter with a foam material.

The invention herein is in the utilization of a base of a conventional fiber material which holds its shape once it is perforated, but providing an overlaying structure of a plasticized material which will tend to grow and form a smaller hole after a punch has been withdrawn from the composite structure. Consequently, a unique design effect is formed without any loss of sound-absorbing qualities.

SUMMARY OF THE INVENTION

The invention relates to a method for producing a uniquely perforated acoustical ceiling product, wherein pin holes close considerably after punching to produce smaller concave holes quite unlike the regular square edge perforations normally found in acoustical products.

The effect is achieved by laminating a plasticized or higher than normal plasticizer containing vinyl film to the surface of a standard fiber composition ceiling board. The film is perforated in the usual manner using various size pins. Immediately after withdrawal of the pins, the holes in the vinyl film slowly begin to close. The final opening in the vinyl film is approximately 25% of the original hole size, and this original hole size is still maintained within the underlying standard fiber composition ceiling board. The closing action of the vinyl film causes the surface of the film at the hole to become concave or dish-shaped, thus producing a unique design effect. In addition, no reduction in NRC is observed due to the fact that the hole in the board is still full size.

The resultant product is a highly scrubbable, damage-resistant, acoustical ceiling product with uniquely designed perforations having considerably smaller hole size than the underlying ceiling board hole size.

BRIEF DESCRIPTION OF THE DRAWING

FIG. I is a showing of a fiber composition ceiling board with the vinyl covering retaining its hole size; and FIG. II is a showing of a conventional fiber composition ceiling board which has been provided with a plasticized vinyl film coating.

DESCRIPTION OF THE PREFERRED EMBODIMENT

Fiber ceiling boards such as that shown in FIG. I are conventional in the art. The boards are normally formed about ¾ inch thick from either vegetable fiber or mineral fiber materials. After the board has been formed by conventional water-laid techniques, it is dried and then perforations are provided in the board. The primary purpose of the perforations is to increase the sound-absorbing ability of the ceiling board. Basically, the perforations permit a ceiling board to absorb more sound than the board would be capable of absorbing if it simply had a plain flat surface. A standard rating system is provided for the purpose of measuring the sound-absorbing ability of the board, and this is generally referred to as the NRC rating of the board.

In FIG. I, the standard fiber composition board 1 is provided with a vinyl film 3. If this vinyl film was unplasticized and was punched, the film would assume and hold the shape shown in the Figure. There would be the square edge hole configuration and the hole in the vinyl would not shrink in size.

Herein, as shown in FIG. II, the perforated acoustical ceiling product 2 is formed of a two-part laminate structure. The base structure is the standard fiber composition ceiling board 4 which has placed on the face thereof a plasticized vinyl film 6. The vinyl film is normally made about 0.015 inch thick and is normally stretched across the ceiling board and edge bonded to the edge of the ceiling board.

The composite product is then provided with perforations which are normally formed by pins in the die of a punch press. The pins are normally 0.050 inch and 0.100 inch in diameter and penetrate beyond the halfway point into the fiber composition board 4. The pin punch will pierce the vinyl layer 6 and penetrate down into the fiber composition board. Normally, the pin will tear some of the fibers in the board structure, but generally the pin simply pushes the fibers downward into the hole 8 and sideways toward the side of the hole 8. The fibers are thus compressed along the side walls and the base of the hole. Removal of the pin from the fiberboard will result in a very minor amount of spring-back of the fibers to slightly reduce the size of the hole in the fiberboard. However, generally speaking, the perforation or hole 8 within the standard fiber composition board is basically that of the size of the pin which made the perforation. The perforation 10 in the vinyl layer 6 is also initially about the same size as the size of the pin making the hole.

If the vinyl film was an unplasticized vinyl film, the hole size in the vinyl film would remain the same as it was when the pin is removed from the total ceiling product as shown in FIG. I. Consequently, the product will end up having a hole in the vinyl and a hole in the fiber composition ceiling board, both being approximately the same size and both being equal in size roughly to that of the pin making the perforation. However, if the vinyl film is made from a highly plasticized vinyl material and allowed to age, the vinyl film hole will slowly begin to close and will continue closing for approximately 24 hours. The final opening in the vinyl film is approximately 25% of the original hole size formed by the punching pin. During the closing action of the vinyl film, the film tends to dish around the hole cavity. This then causes the surface around the edge of the hole in the vinyl film to become concave or dish-shaped, thus producing a unique design effect in the finished product. Even though the board hole size has had its entrance reduced by the vinyl film, there is no reduction in the NRC over that which would exist if the board were measured without the vinyl film closing over a portion of the opening of the perforation 8 in the fiber composition ceiling board. Consequently, you end up with what appears as a smaller size perforation in the board, as seen from the exterior of the board, but you actually secure an NRC rating which is equal to the size of the perforation within the fiber composition ceiling board, which is naturally larger.

Listed below are several examples of vinyl formulations which were utilized and the results obtained therefrom:

| Formulation: | Parts by Weight | | |
|---|---|---|---|
| | No.1 | No.2 | No.3 |
| Polyvinyl Chloride Resin, Firestone FPC 9282, molecular weight — 60,000 | 100 | 100 | 100 |
| Chlorinated Polyethylene Impact Modifier, Dow CPE 3614 | 10 | 10 | 10 |
| Tricresyl Phosphate Plasticizer, Monsanto TCP | 20 | — | — |
| Chlorinated Paraffin Plasticizer, ICI Cereclor S-52 | 10 | 20 | — |
| TiO$_2$ Pigment | 2 | 2 | 2 |
| Calcium Carbonate Filler | 20 | 20 | 10 |
| Organotin Mercaptide, Cincinnati Milacron TM-180 | 2 | 2 | 2 |
| Stearic Acid Lubricant | 1 | 1 | 1 |

Formulation No. 1 will produce the greatest hole size reduction (25% of original) and most noticeable dish-shape design effect. Formulation No. 2 produced a moderate dish-shape effect. Formulation No. 3 produced no dish-shape effect or hole size reduction.

While the theory is not fully understood, it is believed that the plasticizer lowers the modulus of the vinyl film, thereby allowing the film to stretch around the pin during perforation. The elastic memory of the vinyl then causes the film to slowly recover to its original shape, thereby pulling the film away from the sides of the hole and producing the dish-shaped effect and hole size reduction. By plasticized vinyl film is meant a vinyl film material which contains a higher than ordinary level of plasticizer so that the the film is stretchable and will return to its original unstretched size.

The degree of closing is dependent upon the vinyl film composition, especially the plasticizer level, the film thickness and the original hole size. The primary controlling feature is the plasticizer level, it being recognized that as the film thickness increases, the less there will be a tendency for the hole size to reduce. Obviously, the greater the hole, the less the percentage of closing of the hole. The resultant product formed as above is a highly scrubbable, damage-resistant acoustical ceiling product which has a uniquely designed perforation providing considerably smaller hole openings visible on the outside of the board relative to the actual hole size in the board body.

What is claimed is:

1. The process for making an acoustical ceiling product wherein the ceiling product will be composed of a base layer of a standard fiber composition ceiling board to which is laminated a plasticized vinyl film, the steps of laminating the plasticized vinyl film to the standard fiber composition ceiling board, then piercing both the vinyl film and ceiling board with punches to form perforations in both the film and the board, at the same time the vinyl film is pierced, there is a stretching of the vinyl film around the punch, withdrawing the punches from the board and allowing the ceiling product to age to permit the vinyl film perforations slowly to close until the size of the perforations in the vinyl film are substantially less than the size of the perforations within the ceiling board and the vinyl film is concave in the region around the perforations in the vinyl film.

* * * * *